United States Patent [19]

Kuwabara

[11] Patent Number: 4,625,125
[45] Date of Patent: Nov. 25, 1986

[54] METHOD AND APPARATUS FOR CONTROLLING VARIABLE-SPEED HYDRAULIC POWER GENERATING SYSTEM

[75] Inventor: Takao Kuwabara, Hitachi, Japan

[73] Assignee: Hitachi, Ltd., Tokyo, Japan

[21] Appl. No.: 664,436

[22] Filed: Oct. 24, 1984

[30] Foreign Application Priority Data

Oct. 26, 1983 [JP] Japan ................... 58-199041

[51] Int. Cl.⁴ .................................. F01B 25/02
[52] U.S. Cl. .............................. 290/52; 322/14
[58] Field of Search ............ 290/43, 52, 54; 322/14, 322/15, 29

[56] References Cited

U.S. PATENT DOCUMENTS

| 3,678,285 | 7/1972 | Griffith | 290/52 X |
| 3,848,171 | 11/1974 | Speth et al. | 290/52 X |
| 3,886,373 | 5/1975 | Okada | 290/52 |
| 4,393,345 | 7/1983 | Fork et al. | 322/29 X |

Primary Examiner—William M. Shoop, Jr.
Assistant Examiner—W. E. Duncanson, Jr.
Attorney, Agent, or Firm—Beall Law Offices

[57] ABSTRACT

A method and apparatus for controlling a variable-speed hydraulic power generation system using an induction generator of wound-rotor type is disclosed, in which variation in frequency of the power system connected to the power generation system or power demand from the power system is detected and the detected value is applied to a control unit for controlling the guide vane of a hydraulic machine driving the generator, thereby dampening variation in frequency or power balance of the power system.

3 Claims, 5 Drawing Figures

METHOD AND APPARATUS FOR CONTROLLING VARIABLE-SPEED HYDRAULIC POWER GENERATING SYSTEM

The present invention relates to a method and apparatus for controlling a variable-speed hydraulic power generation system capable of rapidly responding to the variations in frequency or power of a power system connected thereto.

A generally-used conventional variable-speed hydraulic power generation system of this type is such that in accordacne with the rotational speed of a generator or generator-motor, an A.C. current of desired frequency is applied to the secondary winding thereof to maintain the output frequency thereof at a constant level. Specifically, the hydraulic power generation system is comprised as shown in FIG. 4 and is operated in the manner as mentioned below. An induction generator of wound-rotor type 1 is used for this purpose with the rotor thereof coupled with a water turbine 2. The secondary winding 1A is excited by a cycloconverter 3 to effect a variable-speed operation. In the variable-speed operation, a command value Nx for the optimum rotational speed and a command value Yx for the optimum opening of the guide vane are produced by a function generator 4. This function generator 4 determines optimum excitation current and speed in response to outputs from a speed detector 6, a heat detector 7 and an output setting unit 8 in such a manner as to satisfy the demand of effective power and reactive power from the power system 5, thereby controlling the cyclo-converter 3 through an amplifier 9 on one hand and a guide vane 11 through an amplifier 10 and servo motor not shown on the other hand.

In this system, the induction generator 1 can continuously rotate at rotational speed coincident with the command value Nx for the optimum rotational speed, if the water turbine is controlled in such a manner that the electrical load torque required for the generator is the same as the mechanical input torque exerted by the water flowing in through the guide vane 11 so that both the torques are balanced with each other. Therefore, in this system, the electrical load torque is controlled to meet the mechanical input torque. Thus, one of the most important tasks of this system is how to control the mechanical input torque, or how to control the command value Yx for the optimum guide vane opening. Since, in general, the water level or head does not change greatly in a short time, the command values produced from the function generator 4 are determined mainly by the output signal of the output setting unit 8 in this system, which may be a local setter or remote setter from a central station on the same power system. As long as the setting of the output setting unit 8 remains constant according to the conventional technique, the value Yz remains constant and the mechanical torque remains unchanged, and in turn the electrical load torque remains unchanged as well. The system of FIG. 4 has a great disadvantage, which will be explained in comparison with a system with a synchronous generator or generator-motor whose rated speed is constant a non-variable as shown in FIG. 5. In FIG. 5, reference numeral 21 designates a synchronous generator coupled with a water turbine 22, numeral 23 guide vanes of the water turbine 22, numeral 24 a speed detector for detecting the speed of the water turbine 22, numeral 25 an opening detector for detecting the opening of the guide vanes 23, and numeral 26 a governor regulator unit for producing a command value Yx for the guide vane opening in response to a rotational speed N detected by the speed detector 24 and an output signal Po produced from an output setting unit 27. Numeral 28 designates a comparator for comparing the command value Yx on the guide vane opening with the actual guide vane opening Yz detected by the guide vane detector 25, and producing an error therebetween, and numeral 29 an amplifier for performing integration and amplifying operation. Thus, the detector 25, the comparator 28, the amplifier 29 and the guide vanes 23 including a servo-motor (not shown) coupled thereto and operated by the amplifier 29 to operate the guide vanes 23 constitute a closed loop control system which operates so as to reduce the error to zero.

Referring to FIG. 5, since the generator 21 is a synchronous machine, the rotational speed $N_D$ of the water turbine 22 is proportional to the frequency f of the power system 5 and given by an equation $N_D=(120f)/p$ rpm (p: number of poles), so that the speed detector 24 may be considered to detect the frequency of the power system 5 itself during power generating operation. Specifically, in the system of FIG. 5, in response even to a slight reduction in the frequency of the power system 5, the command signal Yx is increased to open the guide vanes 23 and in turn to increase the output of the water turbine 22. In the event that the frequency of the power system increases, on the other hand, the command value Yx is reduced in the direction to close the guide vane 23, thus reducing the output of the water turbine 22. This governor function is very important and inevitable for improving the dynamic stability of the power system 5. The system shown in FIG. 4 lacks such an automatic regulating function that the power of the water turbine is automatically adjusted in response to change of balance of the power supply and the load demand to the power system 5.

Here shall be concerned the automatic self dampening capability for compensation of surplus or shortage of the power on the power system which is to be provided on the variable speed generation system itself.

It is sure that this invention can be applied very easily even to the conventional variable speed generation system as shown in FIG. 4 by providing a power system frequency detector or a power demand detector and associated operational amplifiers for cooking the detected signal and by giving the output from the associated operational amplifiers to the output setting unit 8.

The present invention is intended to eliminate the above-mentioned disadvantage of the prior art and to provide a method and an apparatus for controlling a variable-speed hydraulic power generation system, in which the output of the hydraulic machine is reduced by closing guide vanes when the frequency of a power system goes up or the power-minus-load balance of the power system 5 becomes positive, while the output of the hydraulic machine is increased by opening the guide vanes when the frequency of the power system goes down or the power-minus-load balance of the power system becomes negative, whereby changes in the frequency or power-minus-load balance are dampened, thus contributing to improvement of dynamic stability of the power system associated with the variable-speed power generation system using an induction generator.

According to the present invention, there is provided a method and an apparatus for controlling a variable-speed hydraulic power generation system comprising an induction generator of wound-rotor type coupled with a hydraulic machine such as a water turbine or a pump turbine, in which the variation in the frequency of the power system or the power demand from the power system is detected, and the detected value is applied as a control signal to a control unit which controls guide vanes and in turn output from the water turbine in a manner to dampen the variation.

The present invention will be apparent from the following detailed description taken in conjunction with the accompanying drawings, in which.

Figure 1:
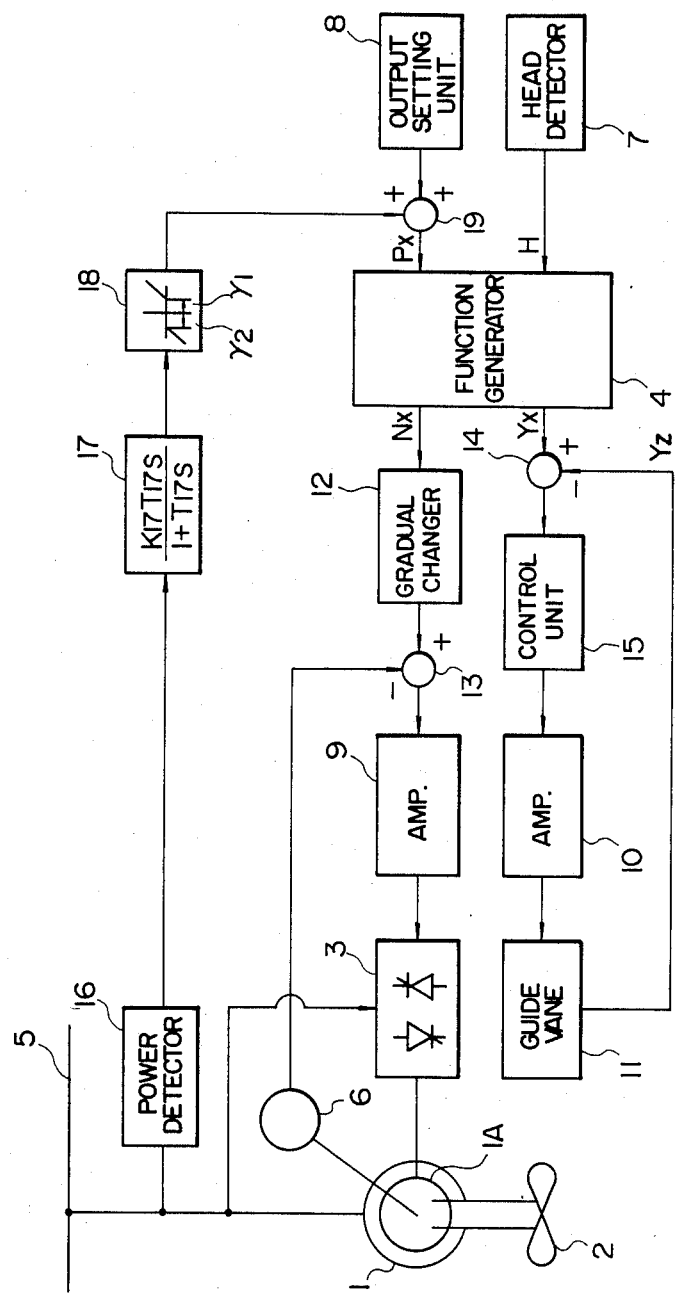
FIG. 1 is a block diagram showing an embodiment of a variable-speed hydraulic power generation system with an induction generator according to the present invention.
Figure 2:
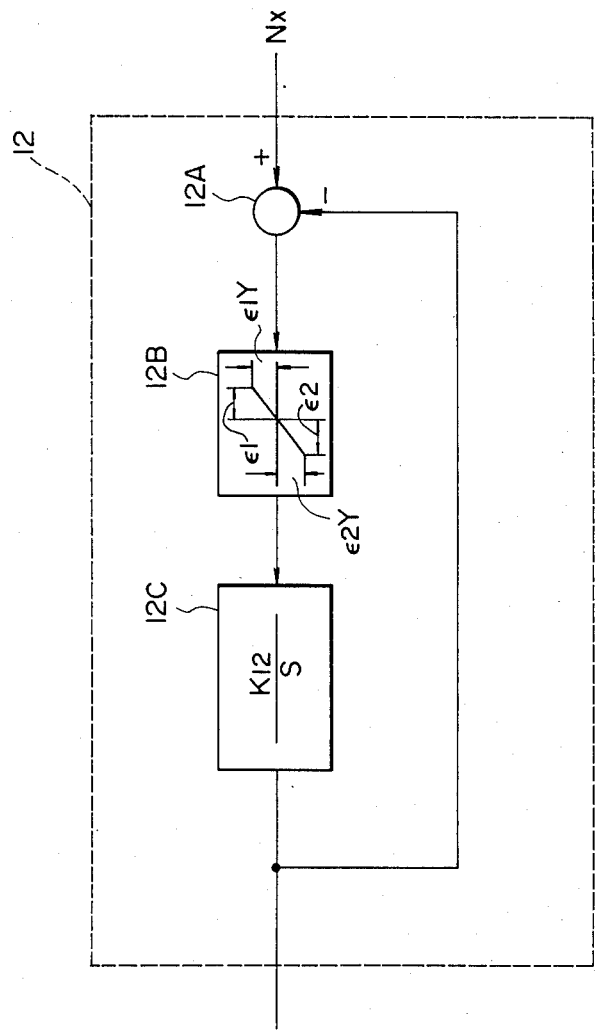
FIG. 2 is a diagram showing in detail a gradual changer in the system of FIG. 1.
Figure 4:
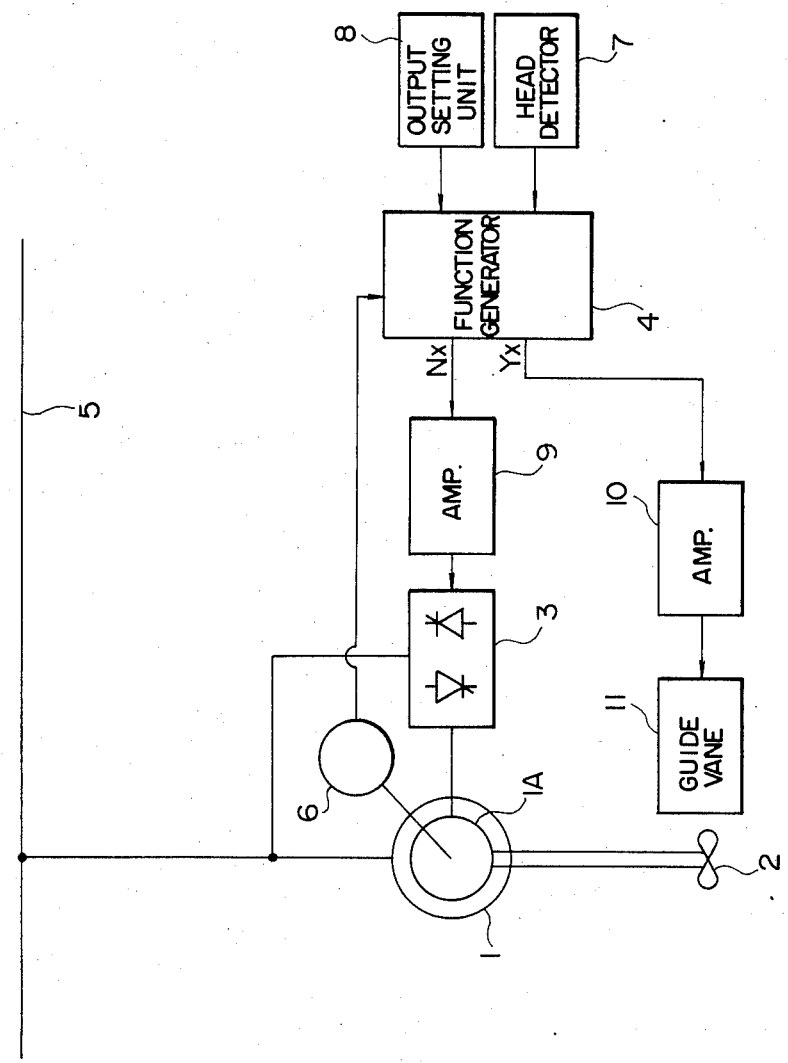
FIG. 4 is a block diagram showing a conventional variable-speed hydraulic power generation system using an induction generator.
Figure 5:
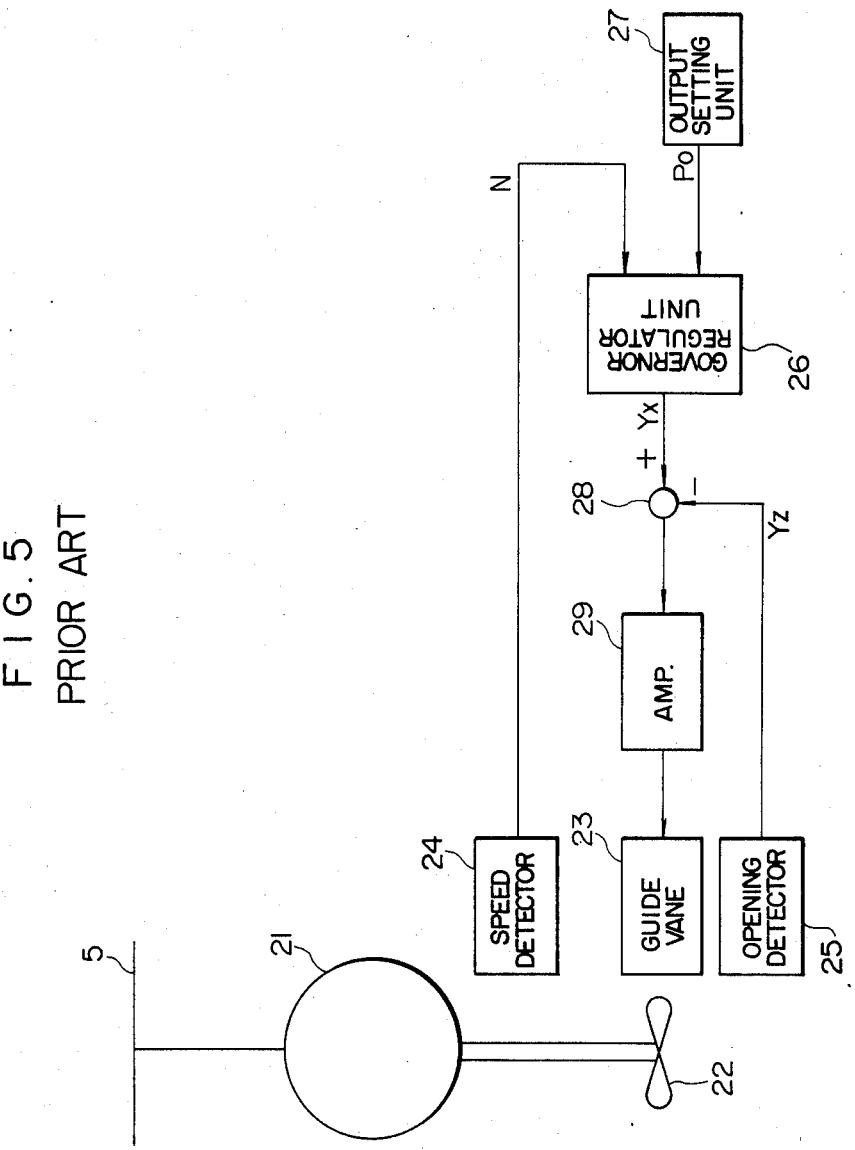
FIG. 5 is a block diagram showing a conventional constant-speed hydraulic power generation system using a synchronous generator.

An embodiment of the present invention will be described with reference to FIG. 1. In FIG. 1, those component elements which have functions similar to those in FIG. 4 are designated by the same reference numerals as those in FIG. 4 and will not be described. Numeral 12 designates a gradual changer for limiting the command value Nx for the optimum rotational speed produced from the function generator 4 so that, when the command value N greatly or suddenly changes, the output signal of the gradual changer is controlled within a tolerable rate of change to prevent a sudden change thereof. Specifically, the gradual changer 12 includes a saturation unit 12B and an integration unit 12C as shown in FIG. 2, so that, even when a great variation occurs at the output of an adder 12A by a sudden change in the command value Nx, the output of the saturation unit 12B is limited to plus $\epsilon_1 y$ or minus $\epsilon_2 y$ if the value is larger than plus $\epsilon_1$ or smaller than minus $\epsilon_2$ and then integrated by the integration unit 12C, so that the output of the gradual changer is prevented from exceeding a predetermined tolerable rate of change. Character $K_{12}$ designates a gain, and S a Laplace operator. Numeral 13 designates a rotational speed comparator means for comparing a rotational speed command signal produced from the gradual changer 12 with an actual rotational speed detected by the speed detector 6. A rotational speed error signal produced from the rotational speed comparator 13 is applied to an amplifier 9. The signal produced from the amplifier 9 is applied as a correction rotational command signal to a cycloconverter 3. Numeral 14 designates a comparator for comparing a command value Yx for the optimum guide vane opening and an actual guide vane opening Yz, numeral 15 a control unit having a desired function such as PID function (P: Proportional element, I: Integration element, and D: Differentiation element), numeral 16 a power detector for detecting an electrical load, that is, power demand from the power system 5 to the induction generator 1, numeral 17 a change rate operational amplifier for producing an output as a function of a change in the power detected by the power detector 16, wherein $K_{17}$ a gain, $T_{17}$ a time constant, and S a Laplace operator. Numeral 18 designates a dead zone element which produces an output of $r-r_1$ for the input larger than $r_1$, an output of $r_2-r$ for the input less than $r_2$ and no output for the input between $r_2$ and $r_1$, where unit 17 r is the input derived from the change rate operational amplifier 17 and $r_1$ and $r_2$ are predetermined threshold values of the input r. The dead zone element 18 is provided for sensitivity adjustment by adding a signal relating to a power change rate produced from the change rate operational amplifier 17 to the output setting signal Px. This is to prevent an excessive influence on the output setting signal Px. Numeral 19 designates an adder for adding the signal produced from the dead zone element 18 to the signal produced from the output setting unit 8. Unlike the prior art power generation technique in which the output setting signal Px is set only by the output setting unit 8, the embodiment of FIG. 1 is so constructed that automatic adjustment is also effected through a circuit including the power detector 16, the change rate operational amplifier 17 and the dead zone element 18. Further, the control unit 15 is effective to assure the stability and responsiveness of the control system including the comparator 14, control unit 15, amplifier 10, guide vanes 11, water turbine 2, induction generator 1, power detector 16, change rate operational amplifier 17, dead zone element 18, adder 19 and the function generator 4.

In this configuration, upon detection by the power detector 16 that the power supply-minus-load demand balance of the power system 5 is varied, the output setting signal Px is temporarily corrected through the change rate operational amplifier 17 and the dead zone element 18. As a result, the command value Yx for the optimum guide vane opening produced from the function generator 4 is automatically corrected to temporarily increase or decrease, and the guide vanes 11 are adjusted to increase or decrease their openings through the control unit 15 and the amplifier 10, so that the output of the water turbine 2 is changed to follow the change of the power balance. In the meantime, the setting of the output setting unit 8 may be corrected at a comparatively slow rate through an automatic power regulation unit of the power system in a remote central control station.

Figure 3:
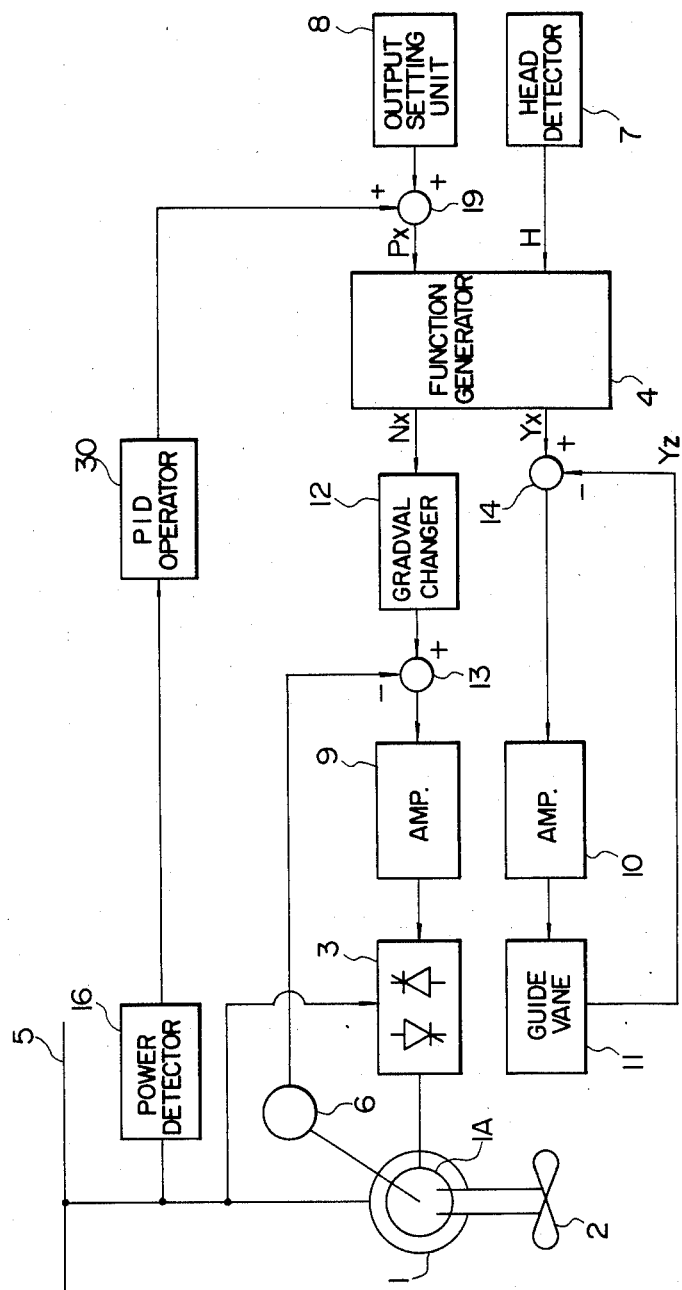
FIG. 3 is a block diagram of a variable-speed hydraulic power generation system according to another embodiment of the present invention.

FIG. 3 shows another embodiment different from that of FIG. 1, in which the control unit 15 of FIG. 1 is omitted, and the change rate operational amplifier 17 and the dead zone element 18 are replaced by a PID operator 30. In this case, the control system is made up of a closed loop circuit including function generator 4, comparator 14, amplifier 10, guide vane 11, water turbine 2, induction generator 1, power detector 16, PID operator 30, adder 19, and function generator 4.

In the above-mentioned embodiments, the power detector 14 is used for detecting variation of the power condition in the power system. But, it may be replaced with equal effect by a frequency detector for detecting variation in the frequency of the power system. In such a case, when the frequency decreases, it indicates that the power-minus-load balance of the power system turns to negative and the total power of the power system is short, so that an increase of the output of the water turbine 2 is desired. An increase in the frequency, on the other hand, indicates the necessity of decreasing the output of the water turbine 2.

It will be understood from the foregoing description that according to the present invention, upon detection of a change in frequency or power demand from a power system, guide vanes are operated thereby to change the output of a hydraulic machine. In this way, the change in frequency or power supply condition of the power system is compensated for, thereby contributing to an improved dynamic stability of the power system connected to a variable-speed hydraulic power generation system using an induction generator or generator-motor.

I claim:

1. A method of controlling a variable-speed hydraulic power generation system comprising an induction generator having an excitation secondary winding, a hydraulic machine connected to said induction generator for driving the same, guide vane means for controlling the quantity of water supplied to said hydraulic machine, a frequency converter for applying an AC excitation to the secondary winding of said induction generator thereby to maintain the output frequency thereof at constant level, and a control unit for changing the quantity of water by controlling said guide vane means on one hand and for changing the amount of excitation by controlling said frequency converter on the other hand, said method comprising the steps of detecting variation is any one of the frequency of a power system electrically connected to said power generation system and a power demand from said power system to said power generation system and controlling said guide vane means by said control unit based on the detected variation so as to dampen said variation.

2. An apparatus for controlling a variable-speed hydraulic power generation system including an induction generator having an excitation secondary winding, a hydraulic machine connected to said induction generator for driving the same, guide vane means for controlling the quantity of water supplied to said hydraulic machine, and a frequency converter for applying an AC excitation to the secondary winding of said induction generator thereby to maintain the output frequency thereof at constant level, said apparatus comprising a control unit for changing the quantity of water by controlling said guide vane on one hand and for changing the amount of excitation by controlling said frequency converter on the other hand based on given set values for parameters relating to the operation of said power generation system, a detector for detecting variation in any one of the frequency of a power system electrically connected to said power generation system and a power demand from said power system to said power generation system, and means for processing and applying an output of said detector to said control unit.

3. An apparatus for controlling a variable-speed hydraulic power generation system according to claim 2, further comprising means inserted between said frequency converter and said control unit for dampening a sudden change in the output of said control unit.

* * * * *